United States Patent [19]
Clawson

[11] Patent Number: 4,589,830
[45] Date of Patent: May 20, 1986

[54] PRESS CONTROL SYSTEM

[76] Inventor: Burrell E. Clawson, 2425 Sunset Dr., Riverside, Calif. 92506

[21] Appl. No.: 724,049

[22] Filed: Apr. 18, 1985

Related U.S. Application Data

[63] Continuation of Ser. No. 519,458, Aug. 1, 1983, abandoned.

[51] Int. Cl.⁴ .............................................. B29C 47/93
[52] U.S. Cl. .................................... 425/150; 192/143; 425/154; 425/590
[58] Field of Search ............... 425/149, 150, 589, 590, 425/451.2, DIG. 223, DIG. 5, 406, 154, 152; 192/129 B, 129 R, 143; 100/53; 264/40.5

[56] References Cited

U.S. PATENT DOCUMENTS

| | | | |
|---|---|---|---|
| 2,759,330 | 8/1956 | Van Broekhoven et al. | 100/46 |
| 2,801,442 | 8/1957 | Moslo | 425/589 |
| 2,808,627 | 10/1957 | Venus | 425/589 |
| 3,263,277 | 8/1966 | Ohlendorf et al. | 425/DIG. 223 |
| 3,423,502 | 1/1969 | Stimpson | 425/590 |
| 3,704,973 | 12/1972 | Renfrew et al. | 425/150 |
| 4,040,595 | 8/1977 | Tecco | 425/589 |
| 4,128,381 | 12/1978 | Bonis | 425/DIG. 5 |
| 4,131,189 | 12/1978 | Stephens | 192/129 B |
| 4,147,486 | 4/1979 | Jahnle | 425/590 |
| 4,341,511 | 7/1982 | Laurent et al. | 425/150 |
| 4,531,901 | 7/1985 | Andersen | 425/150 |

Primary Examiner—Jay H. Woo
Assistant Examiner—J. Fortenberry
Attorney, Agent, or Firm—Grover A. Frater

[57] ABSTRACT

A press control system for presses fitted with floating platens or tools employs hydraulic cylinders and a spring loaded accumulator to bias the floating element against position change on press closure. The hydraulic pressure in the bias system is compared with floating element position to detect abnormal pressure-position relationships.

12 Claims, 6 Drawing Figures

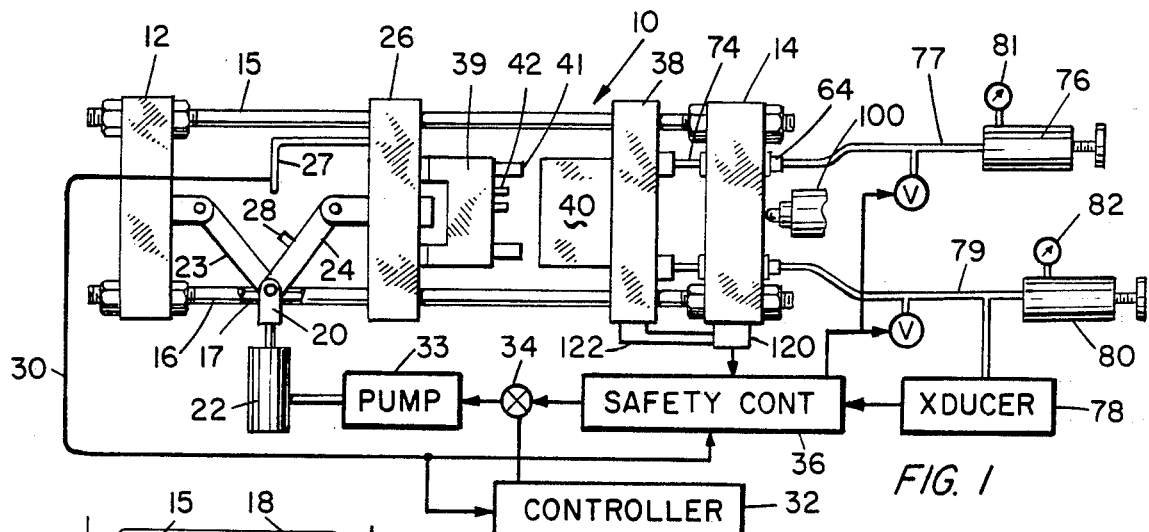
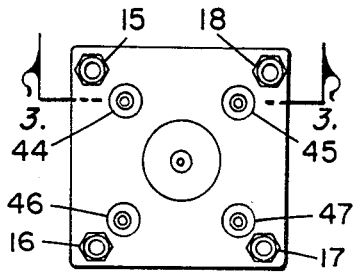
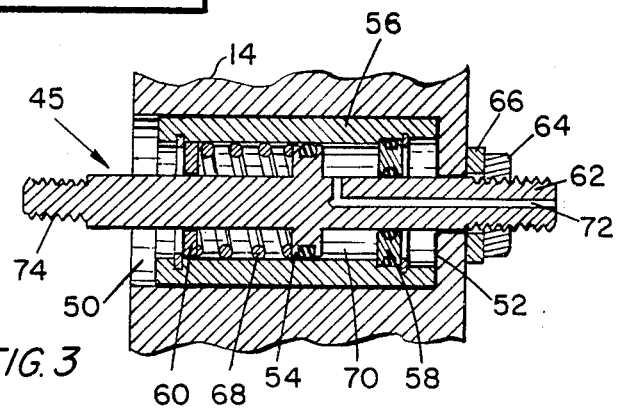
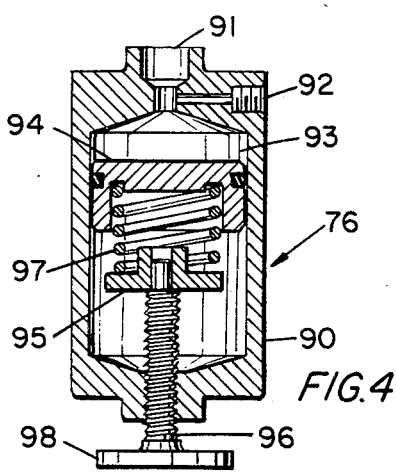
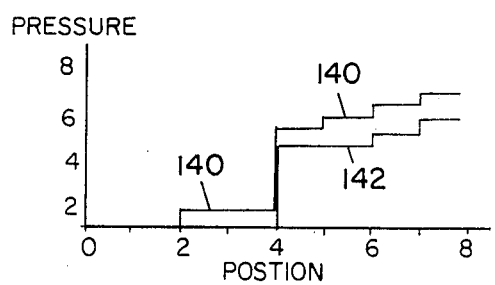
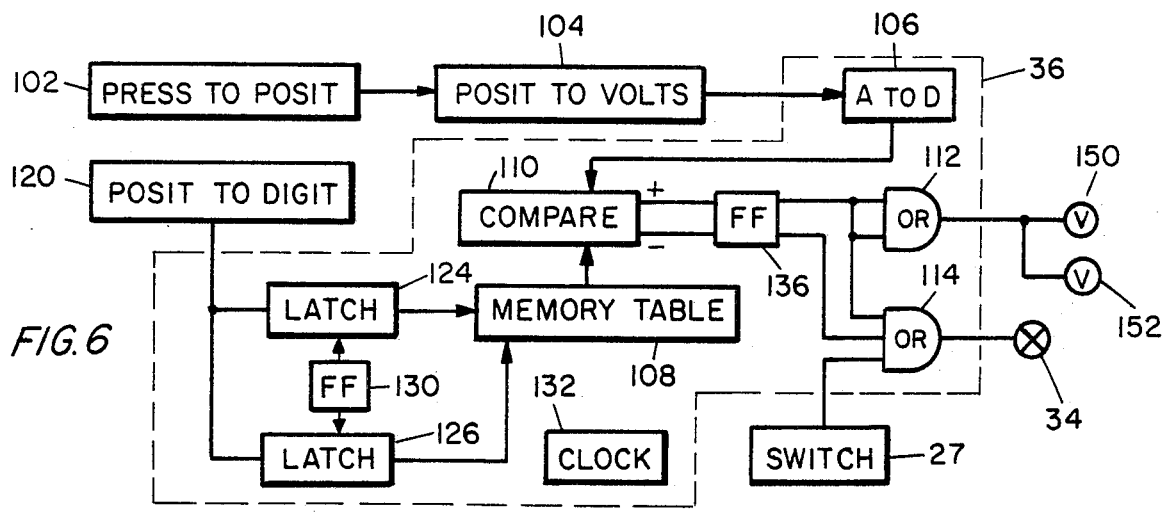

PRESS CONTROL SYSTEM

This is a continuation of application Ser. No. 519,458 filed Aug. 1, 1983, now abandoned.

TECHNICAL FIELD

This invention relates to improvements in the control of hydraulic press operation, and it relates in particular to a novel means for sensing and for controlling the application of closing forces in presses of the kind that have a floating platen.

BACKGROUND ART

Most of the machines that are classified as presses are made to have a frame one part of which is called a platen and another part of which is moveable toward and away from the platen. The moveable part is often called a ram, and it is moved by a mechanism which serves to apply a force to the ram to which reaction is developed in the frame. The mechanism is interposed between the frame and ram, and it changes dimension in its operation to move the ram by an amount called the stroke.

The work to be done is accomplished by the force exerted on a tool or workpiece positioned between the ram and the platen as those elements are forced together, i.e. when the press is "closed."

In most press designs the length of the stroke is fixed and, while the separation between ram and platen in the "closed" condition may be adjustable, it is not variable within a given press stroke. Because of that, there is a danger to the press and to the workpiece if, for some reason, such, for example, as the introduction of additional workpieces between ram and press, the forces or physical dimensions in the system were to change. The danger is increased when the workpiece or material to be pressed is subjected to the action of tool elements carried by one or both of the platen and ram.

If something does go awry, if a tool or workpiece breaks, or if a workpiece is not removed before the succeeding stroke, it may be necessary to stop the ram or take some other remedial action. One solution is to make one element in the system, a tool element or the platen moveable in response to forces in excess of some predetermined force.

In some cases a floating element is provided. The element is carried by a spring cushion formed by an elastomeric material or, more often, actual steel springs.

In presses used to form injection molded plastic parts, the problem of protecting against excessive force application as the press is closed is compounded by the fact that the press is often mounted horizontally such that gravitational forces act in a direction transverse to the pressing force and because it must be structured to receive raw materials injected under high pressure. Thus, it is common in injection molding presses to employ two platens, one fixed and the other carried by the fixed one and moveable relative to it against the bias of steel springs that are interposed between them. The tools for such presses are made of separable sections one carried by the ram and the other by the floating platen. Change in the degree of separation of the floating and fixed platens is caused by application of closing force to the ram, and can be compared, for different degrees of platen separation, to the position of the elements in the mechanism that applies force to the ram. In practice, the comparison is made at one point in the cycle of ram movement. The immediate protective action must be to stop the ram.

DISCLOSURE OF INVENTION

It is an object of the invention to provide improvements in the control and operation of presses, and it is a particular object to provide improvements in the control and operation of plastic injection molding presses and die casting presses.

Another object is to provide an improved system for identifying abnormal conditions within the cycle of press operation and for preventing damage to press and press tools.

It is a purpose and object to provide a means for sensing unexpected pressure levels at the several stages of press closure notwithstanding that the levels at those different stages may be very different.

To realize these and other objects and advantages of the invention which will become apparent upon a reading of the specification that follows, a means is provided for ready adjustment of the bias against movement of the floating element toward the platen and an improvided arrangement is employed for comparing the actual pressure at different positions of the press and tool elements with expected pressures at those positions.

In the invention the fixed spring bias by which the floating platen is held away from the fixed platen is replaced with a means for adjusting the bias at a given degree of separation. In the preferred system that is done with a spring which is biased to an initial level of renitence using hydraulics. Alternatively, it is accomplished using a compressible fluid which is biased to an initial pressure by controlling the volume of the space in which the fluid is contained.

BRIEF DESCRIPTION OF THE DRAWINGS

In the drawings:

FIG. 1 is a schematic diagram of a plastic molding press and a control system in which the invention is embodied;

FIG. 2 is a schematic showing of the side of the fixed platen which faces away from the floating platen in the press of FIG. 1;

FIG. 3 is a cross-sectional view of one of the platen cylinders taken on line 3—3 of FIG. 2, the piston being shown partly in section and partly in elevation;

FIG. 4 is a cross-sectional view of one of the accumulators of the system of FIG. 1;

FIG. 5 is a chart of permissible pressure ranges for different positions of the floating platen relative to the fixed platen; and FIG. 6 is a block diagram of the control system of FIG. 1.

DESCRIPTION OF THE PREFERRED EMBODIMENT

While the invention is applicable to other press forms, it is particularly useful in connection with hydraulically powered plastic injection molding and die casting presses, and that application has been selected, along with the currently preferred form of the invention, for illustration in the drawings.

The press is generally designated 10. It includes a head end plate 12 and a bed plate or fixed platen 14. The head end plate and the bed plate are interconnected by four tie rods 15, 16, 17 and 18, all of which are visible in FIG. 2. Rod 18 is behind rod 15 and, so, is not visible in FIG. 1. Rod 16 is fragmented in FIG. 1 to expose part of rod 17 and also to show the clevis 20. A clevis connects the piston rod of an hydraulic cylinder 22 to the inner end of each of two arms 23 and 24 of a knuckle joint. The arms are pivoted relative to one another and to the clevis. While the means for holding the cylinder 22 has been omitted for the sake of clarity, there is such a means in conventional form. A straight hydraulic cylinder, and other arrangements, are used in some presses in lieu of the toggle. The invention is applicable to any of those forms.

The outer ends of arms 23 and 24 have pivotal connection to the head end plate 12 in the case of arm 23, and to ram 26 in the case of arm 24. The ram slides along the four tie rods as the arms 23 and 24 are scissored open. Ram movement must end when the arms extend in a straight line or the limit of movement of the actuating piston is reached. In practice, the limit point is reached when actuation of a limit switch by ram movement or ram knuckle movement acting in the hydraulic system terminates operation of the piston and cylinder set 22. In the system shown, that is accomplished by actuation of a limit switch 27 mounted on ram 26 by an actuator 28 carried by arm 24. Electrical line 30 connects switch 27 to the primary, conventional CONTROLLER 32 which supplies power to the hydraulic pump 33 through switch 34. Line 30 also connects to a safety controller 36 represented by the box labelled SAFETY CONT.

The ram 26 is moveable along the tie rods toward and away from the floating platen 38. A molding tool has a first part 39 fixed to the ram and a second part 40 fixed to the floating platen 38. Leader pins, one of them numbered 41, and ejector pins, one of them numbered 42, extend from the first part of the tool toward the second. The leader pins enter openings in the second part in which they have a sliding fit. Their purpose is to insure that the two parts of the tool are in exact alignment. The ejection pins are employed to eject the finished, molded piece from the tool, in this case the first part of the tool. They are pushed or pulled, as the case may be, back into the first part of the tool as the tool parts are brought together or before.

After the ram has moved sufficiently to bring the right face of part 39 of the tool to bear against the left face of part 40, further movement of the ram forces the whole of the tool and the floating platen 38 to the right in FIG. 1 toward the fixed bed or platen 14. In prior designs, the displacement of the floating platen is opposed by a number of compression springs. The springs obey Hook's law which defines that the degree of spring compression is equal to the applied force divided by a constant representing the stiffness of the spring. The pressure with which the tool parts are pressed together ultimately can be controlled by changing the separation of the platen and the bed, and that can be controlled by changing the point at which the ram stroke ends by changing the degree in which the arms 23 and 24 are scissored open, or by moving the position of the tie bar nuts at head end plate 12 or, in some cases, by the use of shims between the ram 26 and the first tool part 39 to adjust the initial spacing between the two tool parts.

However, sensing the lower pressures that signal trouble before complete press closure cannot be accomplished by sensing closure pressure. That is accomplished by sensing the forces that tend to move the moveable platen toward the fixed platen 14. The use of fixed springs makes it difficult to recognize undue forces at the floating platen when the tools are being set up initially or if the tools shift during a production run or if an improperly ejected part has remained between the press parts. In the past, the only test has been whether the separation between the floating platen and the bed has been reduced below some preestablished degree of separation before a limit switch such as switch 27 in FIG. 1 is actuated.

In the invention, hydraulic pressure is employed to oppose displacement of the floating platen 38 toward the fixed platen of bed 14. Either a dynamic or static hydraulic system may be employed. This preferred embodiment employs two static systems each formed by a pair of hydraulic cylinders such as the one illustrated in FIG. 3, and an hydraulic accumulator such as the one shown in FIG. 4. The arrangement of the cylinders is shown in FIG. 2. There are four of them. Cylinders 44 and 45 are located in the upper half of the platen whereas cylinders 46 and 47 are located in the lower half.

Cylinder 45 is shown in FIG. 3. It is disposed within a recess 50 formed in that face of fixed platen 14 which faces toward moveable platen 38. The recess is cylindrical and has a flat bottom wall 52. The cylinder 45 is formed by a double ended piston 54. The piston is arranged for reciprocation in a cylindrical sleeve 56 whose ends are closed by end plates 58 and 60. The piston rods extend through central openings in the end plates. Rod 62 also extends through a central opening in the bottom wall of the recess in platen 14. A nut 64, threadedly engaged on the end of rod 62, and a spacer 66 under the nut, serve to limit the degree of travel of piston 54 toward the moveable platen, i.e. leftward in FIG. 3.

A compression spring 68 is trapped between end plate 60 and the piston such that it urges the piston to the right in FIG. 3 which is the direction to reduce the volume in the hydraulic fluid cavity 70. Fluid flows into and out of cavity 70 by a fluid passage 72. The passage extends along the axis of rod 62 and communicates with the cavity by a transverse flowpath near to the face of the piston.

The other piston rod 74 is formed with a threaded end by which it may be assembled with the moveable platen 38 as shown in FIG. 1. The assembly is completed by a number of retaining rings and sealing rings used in conventional fashion.

The flowpaths of the upper cylinders 44 and 45 are connected in parallel with one another and to the chamber of accumulator 76 by a line 77. The flowpath of cylinders 46 and 47 are connected in parallel with one another, and the pressure side of a pressure to electrical signal transducer 78, by a fluid line 79 to the fluid chamber of another accumulator 80. Fluid pressure in the upper cylinders 44 and 45 and accumulator 76 is indicated by a gauge 81. Pressure in the lower cylinders and accumulator 80 is indicated by the gauge 82 and the transducer 78. The latter is represented in FIG. 1 by the box labelled XDUCER.

The upper cylinders 44 and 45 are pressurized in lesser degree than the lower cylinders 46 and 47 to counter the effect of the weight of the tool part 40. The weight being mounted on one side of the floating platen tends to cock it on the tie bars. That tendency can be overcome by having the lower cylinders apply a greater force away from the bed plate than is applied by the upper cylinders. The same effect could be accomplished in a system with a single accumulator connected to all cylinders by the use of upper cylinders having lesser piston area than do the lower cylinders. The preferred arrangement shown in FIG. 1 has the advantage, because accumulator pressure is continuously adjustable, that any degree of pressure difference can be provided.

The accumulator 76 is shown in FIG. 4; it includes a cylindrical outer wall 90. The upper end is closed by a wall having one opening 91 and another 92 by which the fluid conduit 77 and the gauge 81 are connected to the fluid cavity 93. The volume of the cavity and the fluid pressure varies with the position of the piston 94. The piston is disposed for reciprocation in the cylinder. Its position is determined by the position of spring gland 95 which is mounted at the end of a threaded screw 96 and the stiffness of the spring 97. The spring extends from the gland 95 to the piston. Rotating the handle 98 changes the longitudinal position of the spring gland 95. If it is turned to move the gland to increase the pressure, pressure is increased to the cavities of cylinders 44 and 45, and the force exerted on the floating platen 38 is increased.

When the press is open, when no pressure is applied from the ram 26 to the floating platen 38, the position of the floating platen is determined by the position of the cylinder pistons. Thus, as the ram moves to bring pressure to bear on the floating platen 38 and forces it back toward bed 14, the pistons of the cylinders and accumulators are forced back. Consequently, the pressure with which the tool halves are forced together at the end of ram travel is a function of the spring rate of the springs in the cylinder and accumulators and the amount of rotation of the accumulator handles. The effect of the pressure applied by the injection cylinder 100 is no different from what it is in the prior art systems, and is applied only after the safety system has allowed the clamp to "lock up."

It is a feature of the invention that the pressure with which the floating platen 38 is urged toward the fixed bed 14 is measured by the hydraulic pressure in the accumulator and line 77 and/or line 79. That pressure is measured in this embodiment by a pressure-to-voltage converter such, for example, as a strain gauge or pressure actuated variable transformer or resistor. That unit 78 is represented in FIG. 6 by the combination of a pressure-to-position block 102, PRESS TO POSIT, whose output is applied to a position to voltage signal block 104, POSIT TO VOLTS. The output of the latter is an analog voltage which is converted to digital for A to D, analog to digital, block 106. The output of the latter is compared with the output of a memory table 108 represented by block MEMORY TABLE in a comparitor 110, block COMPARE. The comparitor has three outputs a respective one of which goes high if the digital signal from converter 106 is greater than, equal to, or less than the table 108 output, respectively. The "greater than" output is connected to both inputs of an OR gate 112 and to one input of a three input OR gate 114. Another input of OR gate 114 is connected to the "less than" output terminal of comparitor 110, and the third output is connected to limit switch 27 represented in FIG. 6 by the box labelled SWITCH. If a signal appears at either the "greater than" or "less than" output of the comparitor 110, or if switch 27 is actuated by actuator 28 of FIG. 1, then the gate will operate switch 34 of FIG. 1 to turn off the hydraulic pump 33.

The memory table is a set of digital numbers stored in a memory unit. During tryout of new tooling the memory unit might be a read-write unit, but once the tooling is in working order it is preferred that the data be stored in a programmable, read only memory. In this case, the memory table is stored in a 512 bit PROM which has the capacity to store sixty-four eight digit numbers.

The numbers in the memory table represent pressure values at different degrees of separation of the floating platen 38 and the fixed platen or bed 14. If the bed is considered to be a fixed reference, then separation corresponds to position. In this case the memory table contains the values described in the graph of FIG. 5.

There is a position measuring structure in the system of FIG. 1. A digital encoder 120 mounted on bed 14 is operated by element 122. The latter is mounted on, and moves with, the floating platen 38. The encoder may have the form of a linear transformer and analog-to-digital converter combination, or it may be a rotary or linear switching device. In this case it is the latter, and its output is an eight bit number which is applied to each of two LATCH units 124 and 126. A flip-flop 130, FF, responding to signals from the CLOCK 132 applies the position number to the memory unit inputs so that LATCH 124 selects one set of numbers, the high pressure limit numbers, and so that LATCH 126 selects the low pressure limit numbers, for a floating platen position.

In FIG. 5, the distance from 0 to 2 represents ram movement from initial position until the leader pins just begin to enter the second part 40 of the tool. During that interval the pressure must be zero as indicated in FIG. 5.

The distance from position 2 to position 4 represents movement of the ram from the point at which the leader pins enter tool part 2 until the faces of the two halves of the tools come into contact. In that segment of ram movement, a slight movement of the floating platen to produce a pressure no greater than one on the pressure scale of FIG. 5 is tolerated. If, when the position numbers 2 and 3 are applied by latch 124 to the memory table, the number is less than the number which appears at the output of the A to D converter, there will be no output at the plus, greater, terminal of the comparitor.

Because of the output of the A to D converter cannot be less than zero, and the lower limit in FIG. 5 in positions 2 and 3 is zero, there will be no output at the negative, less than, terminal of the comparitor. That is not true, however, when floating platen positions 4 through 8 are latched into the memory table. The clock causes the compare unit to compare alternately for "greater than" and "less than" outputs as flip-flop 130 alternately enables the "greater than" and "less than" outputs of the comparitor.

In FIG. 5, the line 140 represents maximum permitted pressures, and the line 142 represents minimum normal pressures. In FIG. 6, the dotted line represents the unit labelled SAFETY CONT 36 in FIG. 1.

Returning to FIG. 1, there is a valve 150 connected, when open, to open the hydraulic line 77 to relieve pressure in the cylinders 44 and 45 and the accumulator 76. A similar valve 152 is connected, when open, to relieve pressure in line 79, cylinders 46 and 47, and accumulator 80. Both valves are normally closed and are opened electrically. In FIG. 6 they are opened by signals from OR gate 112 if an over pressure indication should appear at the "greater than" output of comparitor 110. In that case, the piston of cylinder 22 will stop moving and pressure on the floating platform will be relieved.

Although I have shown and described certain specific embodiments of my invention, I am fully aware that many modifications thereof are possible. My invention, therefore, is not to be restricted except insofar as is necessitated by the prior art. In this connection, while the preferred embodiment employs incompressible hydraulic fluid, it is entirely possible to practice the invention with gas cylinders and accumulators, and in that case the fluid serves not only as the medium for transferring pressure but it also provides the function of the springs.

It should be noted, too, that the function of the accumulator and piston of the preferred embodiment may be combined into a single structure by making the initial degree of spring pressure adjustable.

I claim:

1. In a press of the type which includes a floating platen and a press bed:
   fluid pressure means for offering opposition to displacement of the platen toward the bed as a function of the degree of displacement of the platen toward the bed;
   said fluid pressure means comprising a hydraulic cylinder including a piston mounted for reciprocation in the cylinder to alter the volume of its hydraulic cavity; and
   said fluid pressure means further including a spring arranged to urge said piston in a direction to reduce the volume of said cavity and means for selectively altering the degree in which said piston is urged in said direction by said spring.

2. The apparatus defined in claim 1 in which said fluid pressure means comprises at least two such hydraulic cylinders and which further comprises means for causing one of said two hydraulic cylinders to offer greater opposition to displacement of the platen toward the bed than is offered by the other of said two hydraulic cylinders at any given degree of separation of said floating platen and said bed.

3. The invention defined in claim 2 which comprises a pair of accumulators each having a variable volume and a spring arranged to apply force in a direction to reduce the volume of its respective accumulator;
   means for connecting the cavity of each of said two hydraulic cylinders to a respectively associated one of said accumulators such as to permit fluid flow between each accumulator and the cavity of its associated hydraulic cylinder; and
   means for selectively adjusting the force applied by at least one of said springs.

4. The apparatus defined in claim 1 which further comprises a variable volume accumulator;
   means for interconnecting the cavity of the cylinder with the accumulator such as to permit fluid flow between the cavity and the accumulator.

5. The apparatus defined in claim 4 which further comprises resilient means for urging a reduction in the volume of said accumulator in selected degree.

6. A pressure control apparatus for a press of the kind in which a ram is moved toward and away from a platen which is itself movable toward a fixed bed, comprising:
   initial displacement adjusting means responsive to a hydraulic pressure for altering the separation of platen and bed independent of ram movement;
   movement opposing means responsive to the application of force to said platen as an incident to displacement of the ram which force tends to displace the platen toward the bed for opposing such displacement of the platen in proportion to the degree of separation of said platen and said bed;
   means for detecting that said platen has been moved to the first one and the second one of at least two positions relative to the said bed; and
   means for interrupting displacement of said platen if the force opposing movement of the platen falls without a first range of forces when said platen occupies said first one of said positions and for interrupting displacement of said platen if the force opposing movement of the platen falls without a second range of forces when the platen occupies said second one of said positions.

7. The apparatus defined in claim 6 in which said movement opposing means operates to develop an hydraulic pressure proportional to the degree of opposition to such movement; and
   which comprises means for measuring said hydraulic pressure when the platen occupies each of said first and said second positions; and
   in which said means for interrupting movement of said ram is responsive to said means for measuring said hydraulic pressure.

8. The apparatus defined in claim 7 which further comprises means for relieving said hydraulic pressure in the event that the pressure falls above said first or second force range when said platen occupies said first and said second position, respectively.

9. In a press of the kind that includes a floating platen and a bed:
   fluid pressure means for opposing displacement of the platen toward the bed in a degree which increases with the degree of such displacement;
   an elastic element whose renitence is adjustable;
   means for selectively adjusting the renitence exhibited by said elastomeric element; and
   means for altering the degree in which said fluid pressure means opposes displacement of the platen toward the bed at different degrees of such displacement as an incident to selective adjustment of the degree of renitence exhibited by said elastic element.

10. The apparatus defined in claim 9 in which said fluid pressure means comprises a cylinder and in which elastic element comprises an accumulator, each of said cylinder and accumulator having a variable volume cavity for hydraulic fluid; and
    which apparatus further comprises a flowpath for hydraulic fluid interconnecting the cavity of the cylinder and the cavity of the accumulator.

11. The apparatus defined in claim 10 in which said accumulator includes means in the form of a spring effective to exert pressure to alter the volume of the cavity of the accumulator; and
    which further comprises means for selectively altering said pressure exerted by said spring.

12. The apparatus defined in claim 10 in which said cylinder comprises a piston and means in the form of a spring for applying forces to urge a reduction in the volume of the fluid cavity in said cylinder.

* * * * *